(12) United States Patent
Auffret et al.

(10) Patent No.: US 8,843,549 B2
(45) Date of Patent: Sep. 23, 2014

(54) STREAMING METHOD FOR TRANSMITTING TELEPHONE SYSTEM NOTIFICATIONS TO INTERNET TERMINAL DEVICES IN REAL TIME

(75) Inventors: Jean-Marc Auffret, Lannion (FR); Jean-Francois Jestin, Lannion (FR); Xavier Marjou, Locquemeau (FR)

(73) Assignee: Siemens Aktiengesellschaft, Munich (DE)

( * ) Notice: Subject to any disclaimer, the term of this patent is extended or adjusted under 35 U.S.C. 154(b) by 1938 days.

(21) Appl. No.: 10/396,698

(22) Filed: Mar. 26, 2003

(65) Prior Publication Data

US 2003/0236924 A1 Dec. 25, 2003

(30) Foreign Application Priority Data

Mar. 27, 2002 (EP) .................................. 02007031

(51) Int. Cl.
*G06F 15/16* (2006.01)
*H04L 12/66* (2006.01)
*H04L 29/06* (2006.01)
*H04L 12/18* (2006.01)
*H04L 12/54* (2013.01)
*H04L 12/58* (2006.01)
*H04M 3/42* (2006.01)
*H04M 7/00* (2006.01)
*H04M 3/56* (2006.01)

(52) U.S. Cl.
CPC .......... *H04L 65/1043* (2013.01); *H04M 7/006* (2013.01); *H04L 65/4038* (2013.01); *H04L 12/1818* (2013.01); *H04L 29/06027* (2013.01); *H04M 7/0009* (2013.01); *H04L 12/66* (2013.01); *H04L 12/56* (2013.01); *H04L 12/581* (2013.01); *H04M 7/003* (2013.01); *H04M 2201/38* (2013.01); *H04M 3/42178* (2013.01); *H04L 51/04* (2013.01); *H04M 3/56* (2013.01)
USPC ............................................ 709/204; 709/246

(58) Field of Classification Search
CPC ... H04M 7/006; H04L 65/103; H04L 65/608; H04Q 3/0029
USPC .......... 709/206, 207, 231, 204, 246; 370/352, 370/466
See application file for complete search history.

(56) References Cited

U.S. PATENT DOCUMENTS 6,181,691 B1 * 1/2001 Markgraf et al. ............. 370/352
6,778,652 B2 * 8/2004 Gaus et al. ............... 379/201.01

OTHER PUBLICATIONS

Request for Comment (RFC) 2068, "Hypertext Transfer Protocol—HTTP/1.1," Jan. 1997 (pp. 1-2 and 43).*

* cited by examiner

*Primary Examiner* — David Lazaro
(74) *Attorney, Agent, or Firm* — King & Spalding L.L.P.

(57) ABSTRACT

In the course of an application involving real-time notification of a client by a telephone switching system, a connection between the client and a server is opened. Notification messages transmitted from the telephone switching system to the server are adjusted and sent to the client in the format of a programming language code executable by the client's browser. The programming language codes are subsequently executed by the browser, whereby the respective notification messages are displayed at the client. For transmission of the notification messages from the server to the browser, as streaming method such as HTTP streaming is use so that the connection remains open while notification messages are to be sent. The presented method can be based on standardized protocols, entails little protocol overhead and allows for facile treatment of security issues.

10 Claims, 2 Drawing Sheets

STREAMING METHOD FOR TRANSMITTING TELEPHONE SYSTEM NOTIFICATIONS TO INTERNET TERMINAL DEVICES IN REAL TIME

TECHNICAL FIELD OF THE INVENTION

This invention relates to a method for an application involving real-time notification of a client by a telephone switching system.

BACKGROUND OF THE INVENTION

Advances in crosscutting technologies have brought about convergence of data and voice networks. In particular, new services have been proposed that merge telephony and inter-networking. As a caveat these services entail a higher degree of complexity. In view of the customer's satisfaction service providers strive to hide the complexity from the user and to offer levels of transparency comparable to PSTN (public switched telephone network) services.

Usually, combining PSTN switching and internetworking comes at the price of proprietary solutions and hence leads to a lack of interoperability and scalability. The deployment of well-established hardware components and standardised software solutions would be desirable to improve on this situation. A category of services where these observations apply are services based on PSTN calls that are controlled or monitored via an Internet terminal device, such as PSTN phone conferences started and controlled via a PC or PSTN calls triggered by clicking on a Web page (click-to-dial). Many of these services require real-time processing of control information, such as PSTN signalling, ISDN service parameters or notification messages.

SUMMARY OF THE INVENTION

The present invention aims to provide an efficient method for real-time notification of a client by a telephone switching system in real time.

The initial step the method according of the invention includes setting up a connection between the client and a server. The server may comprise application-specific support means, such as data storage means. The connection can be established via a HTTP (hypertext transfer protocol) request which transmitted from the client to the server. In the course of the application notification messages are transmitted from the telephone switching system to the server. Possibly, the notification messages are transmitted via one or several physical entities that are typically found in the transmission path of PSTN signalling messages, such as an SCP (service control point) in the case of an IN (Intelligent Network) network or a media gateway controller in the case of network interworking. Notification messages to be sent from the server to the client are encoded so that they are represented in the form of a programming language code executable by the client's browser, e.g. JavaScript, HTML or an XML-type language (XML: extended markup language). The adjusted notification messages are streamed in from the server to the client by means of a streaming technique, such as HTTP streaming. The connection between the client and the server remains open in the intervening period between the transmission of individual notification messages. The programming language codes are executed by the client's browser, whereby the respective notification messages are outputted at the client.

The present invention allows for using proven standardised protocols such as HTTP for the client-server connection. Within streaming methods, e.g. HTTP streaming, the protocol header of the server response messages needs only be transmitted once, viz. when the connection request by the client is acknowledged. Further notification messages are streamed in without response header. Thus, the protocol overhead is small. The present method can do without client-side plugins, ad-ons or downloading of library routines as common for CORBA (common object request broker architecture), RMI (remote method invocation) or EJB (enterprise JavaBeans). Security issues can simply accounted for by authenticating and authorising the client via his connection request. The authentication and/or authorising needs not to be repeated as for scenarios where a connection is set up each time when a notification message is transmitted.

In one embodiment messages are regularly sent from the server to the client to enquire whether the connection still needs to be kept open. The connection can be closed when no more further notification messages are to be transmitted. The opening of the connection between the client and the server can be performed by invoking a server-side Java applet. A Java-based runtime environment provides for flexibility as Java was conceived to be independent of the specific platform and software solutions on the client side.

BRIEF DESCRIPTION OF THE DRAWINGS

Below the invention is described by way of example and with reference to figures.

DETAILED DESCRIPTION OF THE INVENTION

Figure 1:
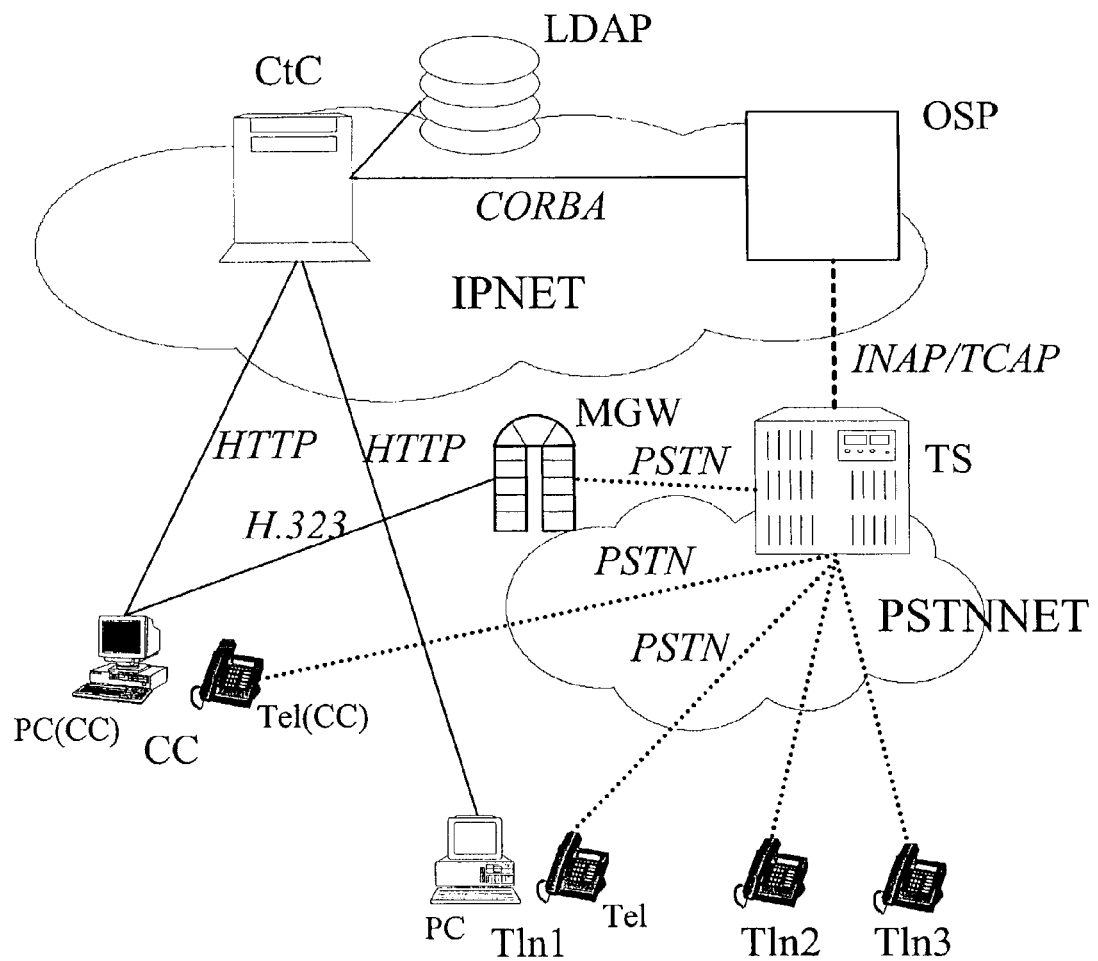
FIG. 1 shows an example for the present method applied to a phone conference that is controlled via the Internet.

FIG. 1 shows an embodiment of the invention applied to a scenario where a telephone conference is invoked and controlled via a Web terminal device PC(CC), such as a personal computer connected to the Internet IPNET. The controlling of the phone conference includes the steps of preparing and initiating a conference, adding a conferee to an already established conference, and closing the conference by on-hook. In this context the term "conferee" relates to all users who participate in the telephone conference except for the conference controller CC. In addition to the telephone conference a synchronised Web surfing session may be provided for those conferees who have access to the Internet IPNET. To initiate the telephone conference the conference controller CC sets up an HTTP connection to the conference server CtC via the Internet IPNET. Authentication information such as details of the initiator, i.e. the conference controller CC, and the conferees Tln1, Tln2 and Tln3 as well as an access PIN (personal identification number) may be provided. Optionally, the controller CC may specify the use of a VoIP (voice over IP) connection mediated through the H.323 or the SIP (session initiation protocol) protocol in place of a PSTN connection. For retrieval and storage of authentication information and authorisation information a LDAP server LDAP is placed in the vicinity of the Web conference server CtC. The Web conference server CtC is linked to an open service platform OSP by means of CORBA (Common Object Request Broker Architecture), which provides an environment for distributed applications on top of the TCP/IP (transmission control protocol over internet protocol) protocol stack. APIs (Application programming interfaces) of the open service platform OSP allow for the provision of additional services and the implementation of additional service features. In addition, the open service platform OPS receives signalling messages for call control of the telephone conference from a telephone switch TS, which are relayed to the Web conference server CtC. Messages between the open service platform OSP and the telephone switch TS are exchanged via the protocols INAP (intelligent network user part) and TCAP (transaction capability application part). These two protocols are commonly used for communication between an SSP (service switching point) and an SCP (service control point) in an IN (intelligent network) network architecture with SS7 (signalling system 7) signalling. The telephone switch TS, e.g. an ISDN switch, assumes switching functions for the PSTN connections of the telephone conference. Possibly, a PSTN connection is relayed to a media gateway MGW to allow for participation of conferees or the conference controller CC via VoIP (voice over IP).

Conferees may have Internet access in addition to access to the PSTN network. FIG. 1 shows a conferee Tln1 who disposes of a personal computer PC with Internet access as well as a PSTN telephone Tel. The other conferees Tln2 and Tln3 are only connected to a PSTN network PSTNNET and participate through PSTN connections. The conference controller CC may connect to the switching system or telephone switch TS, either by means of a PSTN call (telephone Tel (CC)) or through a VoIP call (personal computer PC(CC)). In the latter case a media gateway MGW is necessary to account for the change of bearer (IP network with H.323 versus PSTN network with SS7). Call-related signalling messages from the telephone switch TS, such as No-answer, Could-Not-Be-Reached, Connected, Release etc. are displayed in real time on the conference controller's personal computer PC(CC) and optionally to conferees Tln1 with Internet access. The real-time notification of the conference controller CC and possibly of conferees Tln1 with Internet access is realised by means of a combination of server-side Java servlets and dynamic HTTP. The deployment of Java applets has the advantage that a CC-side proxy (interface) can be serialised, i.e. admitted as parameter information to be exchanged between client, i.e. in this embodiment the conference controller's personal computer PC(CC), and server CtC in the process of binding. Thus, the CC-side proxy and other proxies involved in the application can be passed on to other clients. For example, an information handle including the CC-proxy can be put at the disposal of conferees Tln1 with Internet access so that new conferee-side proxies need not be generated.

In the preferred embodiment the notification mechanism is based on server-side Java servlets in combination with dynamic HTML. To start the notification mechanism a server-side servlet is invoked through an HTML request by the client PC(CC). By invoking the Java servlet the client PC(CC) subscribes to receive notification messages transmitted from the telephone switch TS.

An HTTP connection is set up for streaming in messages from the server CtC to the client PC(CC). In contrast to the original client-server communication, where the HTTP connection is closed after fetching an HTTP page, the connection remains open while fresh notification messages are pushed to the client PC(CC). Through the subscription by the client a format is specified for notification messages to be sent by the server CtC to the client PC(CC). This format is chosen to be a computer code that can be executed by the client's browser, such as JavaScript, XML, HTML or Java-serialised objects. The latter format can be used for browsers that make use of client-side Java classes. Via the subscription request by the client the transmission protocol for the streaming is specified, too. Preferably, this protocol is chosen to be HTTP, but other choices such as TCP (transmission control protocol), UDP (user datagram protocol), RMI (remote message invocation) etc. are possible, too. The notification messages from the telephone switch TS that are received by the server CtC are formatted or adjusted for transmission to the client PC(CC). These messages are dispatched by means of a Java servlet, which is sometimes called pushlet, that pushes or sends the notification messages to the client's browser. The pushing or sending of computer code that is executed by the client's browser is a mechanism originally applied in the framework of dynamic HTML (DHTML). Traditionally, a page could be altered only by reloading a new page from the server. DHTML allows full control of an HTML document within a browser after the page has been loaded. From a programmer's point of view the entire document in the Web browser—frames, images, paragraphs, tables etc.—is represented as a hierarchical object model, the DOM (document object model). Through JavaScript or any other computer code executable by the browser one can dynamically manipulate the elements of the DOM and thereby change the content or appearance of the document. The official standards body for DHTML-related specifications is the World Wide Web Consortium (W3C). The client's GUI (graphical user interface) is dynamically updated with new notification messages streamed in from the server.

Figure 2:
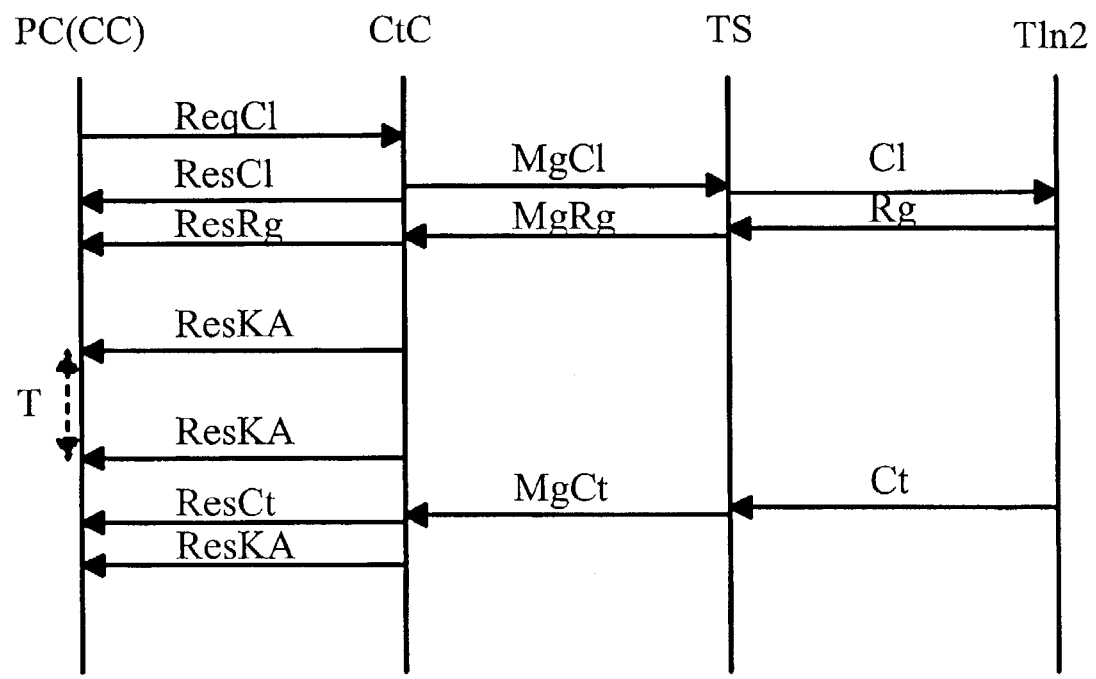
FIG. 2 shows a diagram of the sequence of exchanged messages in accordance with the invention.

FIG. 2 shows a diagram with a sequence of exchanged messages for adding conferee Tln2 to the telephone conference. The sequence of exchanged messages is:

RegC1: A request RegC1 to call conferee Tln2 is transmitted from the client PC(CC) to the conference server CtC.

MC1: A message MC1 referring to the request to call conferee Tln2 is transmitted from the server CtC to the telephone switch TS.

C1: Upon reception of message MC1 a PSTN call of conferee Tln2 is issued by the telephone switch TS.

Rg: The PSTN call is acknowledged from the telephone of conferee Tln2 by generating a signal for the calling terminal device (ringing).

MgRg: The acknowledgement by the telephone of conferee Tln2 is signalled by the telephone switch TS to the server CtC via the notification message MgRg.

ResRg: the notification message MgRg is adapted and transmitted as a DHTTP response ResRg from the server CtC to the client PC(CC).

ResKA: After every time period T an HTTP response is sent from the server CtC to the client PC(CC) to inform the client that the HTTP connection should be kept open (KA: keep alive). Effectively, streaming is a call back by the server to the client during a client-server connection.

Ct: The connection between the telephone switch TS and the conferee's telephone is established.

MgCt: The set-up of the connection between the telephone switch TS and conferee Tln2 is signalled by the telephone switch TS to the server CtC via the notification message MgCt.

ResCt: the notification message MgCt is adapted and transmitted as a DHTTP response ResCt from the server CtC to the client PC (CC).

Although the above preferred embodiment describes a scenario where notification messages are transmitted from an ISDN switch-to an Internet terminal device PC(CC) via the Internet, the present method could also be used in a constellation where notification messages are transmitted from a PBX (private branch exchange) via a private IP network (intranet).

We claim:

1. A method for an application involving real-time notification of a client by a telephone switching system, comprising:
   a) opening a connection between the client and a server;
   b) transmitting notification messages from the telephone switching system to the server using a networking protocol;
   c) transforming the notification messages at the server into a programming language code and using said networking protocol for sending the programming language code to the client, wherein the programming language code is executable by the client's browser;
   d) using an HTTP streaming mechanism for transmission of the notification from the server to the browser through the open connection, whereby the connection between the client and the server remains open in the intervening period between the transmission of individual notification messages; and
   e) executing the programming language codes by the browser whereby the respective notification messages are displayed or outputted at the client.

2. The method according to claim 1, further comprising: closing the client-server connection as no more real-time notification messages are to be sent within the application.

3. The method according to claim 1, further comprising: opening the client-server connection by invoking a server side Java applet.

4. The method according to claim 1, further comprising: using the HTTP protocol for the client-server connection.

5. The method according to claim 1, further comprising: sending regularly messages from the client to the server to enquire whether the connection still needs to be kept open.

6. The method according to claim 1, further comprising:
   a) transmitting the notification messages from the telephone switching system to a media gateway controller or an SCP;
   b) adjusting the notification messages for transmission to the server; and
   c) transmitting the notification messages from the media gateway controller or the SCP to the server.

7. The method according to claim 1, wherein
   a) the application is given by a phone conference; and
   b) the server comprises means for supporting phone conference services.

8. The method according to claim 1, wherein the telephone switching system is given by an ISDN switch or a PBX.

9. The method according to claim 1, wherein programming language codes for execution by client-side browsers are generated in one of JavaScript, XML, or HTML or Java-serialised objects.

10. A method for an application involving real-time notification of a client by a telephone switching system, comprising:
    a) opening a connection between the client and a server;
    b) transmitting notification messages from the telephone switching system to the server using a networking protocol;
    c) transforming the notification messages at the server into a JavaScript programming language code and using said networking protocol for sending the JavaScript programming language code to the client, wherein the JavaScript programming language code is executable by the client's browser;
    d) using an HTTP streaming mechanism for transmission of the notification from the server to the browser through the open connection, whereby the connection between the client and the server remains open in the intervening period between the transmission of individual notification messages; and
    e) executing the JavaScript programming language codes by the browser whereby the respective notification messages are displayed or outputted at the client.

* * * * *